A. A. KING.
NUT LOCK.
APPLICATION FILED MAY 19, 1914.

1,139,191.  Patented May 11, 1915.

Witnesses

Inventor
A. A. King
By
Attorneys

UNITED STATES PATENT OFFICE.

ALONZO A. KING, OF PAONIA, COLORADO.

NUT-LOCK.

1,139,191.   Specification of Letters Patent.   Patented May 11, 1915.

Application filed May 19, 1914. Serial No. 839,602.

*To all whom it may concern:*

Be it known that I, ALONZO A. KING, citizen of the United States, residing at Paonia, in the county of Delta and State of Colorado, have invented certain new and useful Improvements in Nut-Locks, of which the following is a specification.

This invention relates to nut locks and has for its object to provide a device of this character including a spring actuated pawl which is detachably connected to the nut and so arranged as to automatically engage the bolt to which the nut is applied upon retrograde movement of the nut, the nut being formed with a flange or shoulder arranged to engage the pawl when moved to operative position, to securely maintain the pawl in position upon the nut. And the invention has as a further object to generally improve the construction and increase the efficiency of devices of the above described character.

With these and other objects in view my invention will be more fully described illustrated in the accompanying drawings and then specifically pointed out in the claims which are attached to and form a part of this application.

Figure 1:
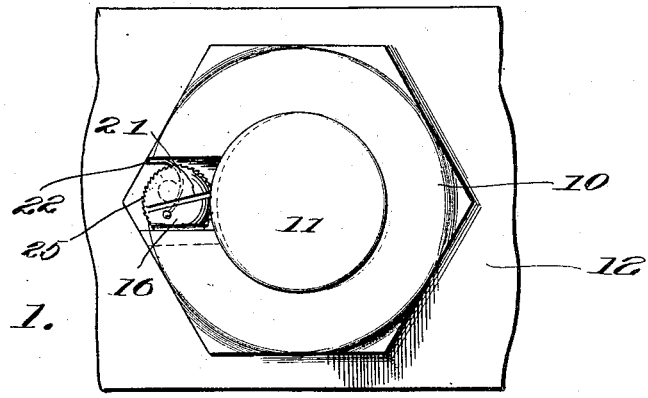
Figure 2:
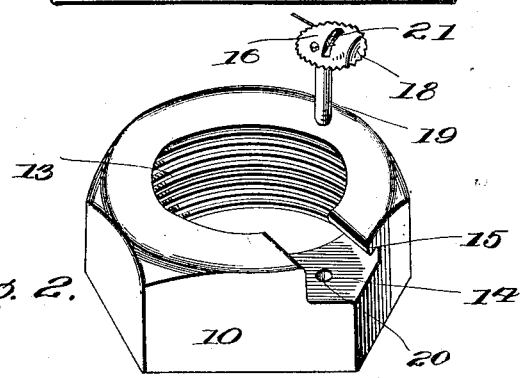
Figure 3:
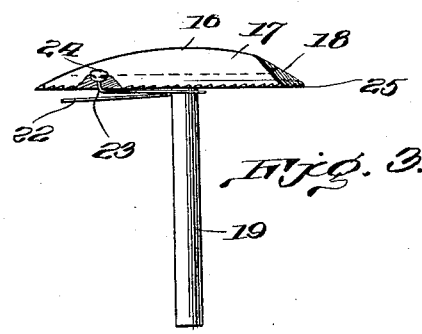

In the accompanying drawings: Figure 1 is a top plan view showing my improved nut lock in operative position. Fig. 2 is a perspective view of the nut especially showing the pawl receiving recess formed therein and the shoulder arranged to maintain the pawl in position, the pawl being shown detached but in proper relative relation, and Fig. 3 is a detail view of the pawl and a spring which is detachably connected thereto.

Corresponding and like parts are referred to in the following description and indicated in all the views of the drawings by the same reference characters.

My improved nut lock is adapted for use in connection with any ordinary bolt of usual construction wherein the nut is screw threaded upon the bolt and in Fig. 1 of the drawings, I have shown the nut 10 applied to a bolt 11, the bolt being illustrated in position within the work 12.

The nut 10 is provided with the usual threaded bolt opening 13 and has formed in its upper face a transversely extending recess 14, the recess 14 communicating with the bolt opening 13 and opening upon the adjacent side face of the nut. Formed on the nut upon one side of the recess 14 and arranged to provide a continuation of the upper face of the nut, is a shoulder 15 which is arranged to project within the recess 14 and is upwardly spaced from the bottom wall thereof as shown. The particular function of this shoulder 15 will be presently described. Detachably mounted within the recess 14 of the nut is a pawl 16 which includes preferably, a substantially circular head 17, the upper face of which is oval and is cut away upon one side adjacent the periphery of the head to provide a beveled face 18, while the inner face of the head is flat to move adjacent the flat bottom wall of the recess 14. Formed on the head 17 of the pawl is a stem 19 which is received within a bore 20 formed in the bottom wall of the recess 14. The head 17 is eccentrically mounted upon the stem 19 and the pawl is arranged to oscillate freely within the recess 14 of the nut.

The head 17 is preferably provided with a groove 21 adapted to receive a screw driver or other tool for manually turning the pawl when it is desired to move the pawl to inoperative position and detachably connected to the head is a spring 22. As best shown in Fig. 3 of the drawings, the body portion of the spring 22 is preferably U-shaped, the bight portion thereof being arranged to embrace and rest against the stem 19. At one extremity, the spring 22 is bent laterally as shown at 23 to extend through a suitable aperture formed in the head 17 and is provided with a head 24 arranged to maintain the spring in position.

The width of the head 17 is slightly less than the distance between the free extremity of the shoulder 15 and the opposite side wall of the recess 14, and by this arrangement it will be observed that the pawl 16 may be readily positioned within the recess and may, with equal facility, be removed therefrom. This is obviously an advantageous arrangement since in the event the pawl 16 becomes broken, it may be readily replaced. It will further be noted that the spring 22 may also be readily disconnected from the head 17 of the pawl, thus further permitting the ready repair of the device in case of breakage.

In Fig. 1 of the drawings, I have shown my improved nut lock in position upon a bolt, the pawl being illustrated in engagement with the bolt. The free extremity of the spring 22 is arranged to bear against the side wall of the recess 14 of the nut opposite the shoulder 15, the spring thus normally acting to maintain the head 17 of the pawl projected into the bolt opening of the nut to engage the bolt. The peripheral edge of the head 17 of the pawl is serrated or provided with a plurality of teeth 25 and since the head 17 of the pawl is eccentrically mounted upon the stem 19, the peripheral edge of the head presents a cam face arranged for locking engagement with the bolt 11, the teeth 25 biting into the bolt to thus securely hold the nut 10 against retrograde movement.

Particular attention is now called to the function of the shoulder 15 which shoulder is so arranged as to engage the upper inclined face 18 of the head of the pawl when the pawl is moved to operative position in engagement with the bolt. This is best shown in Fig. 1 of the drawings and it will be observed that the adjacent portion of the periphery of the head 17 is disposed to turn beneath the shoulder 15 the face 18 of the head of the pawl being arranged so as to engage the shoulder 15 to maintain the pawl in operative position upon the nut. Accidental loss of the pawl when in actual use is thus prevented while at the same time a construction is provided wherein the pawl may be easily removed from the nut when desired.

When the nut 10 is applied to the bolt, the pawl 16 will be turned to one side within the recess 14 by the bolt and the presence of the pawl upon the nut will not, therefore, interfere with its ready application to the bolt. In a device of this character which is often exposed to the weather, it is important that the rusting of the parts which may occur shall not interfere with the turning movement of the pawl and in arranging the spring 22 between the flat face of the head of the pawl and the bottom wall of the recess 14, said faces are so spaced as to prevent any rusting of said faces from impeding the movement of the pawl. It will therefore be seen that I provide an exceedingly simple and efficient construction for the purpose set forth which may be applied to any bolt of the ordinary type without change in the construction thereof and which is adapted to automatically engage the bolt upon the application of the nut thereto and is so arranged as to positively prevent the retrograde movement of the nut.

Having thus described my invention, what I claim and desire to secure by Letters Patent is:—

1. A nut lock including a nut bored to receive a bolt and being recessed to receive a pawl, said nut having a shoulder formed thereon adjacent said recess, a pawl detachably mounted in said recess and adapted for interlocking engagement with the bolt, said pawl being normally removable from the nut and being movable into interlocking engagement with said shoulder when engaged by the bolt for maintaining the pawl in operative engagement with the nut.

2. A nut lock including a nut bored to receive a bolt and having a recess formed therein, a shoulder formed on the nut adjacent said recess, a pawl mounted to turn in said recess and detachably connected with the nut, said pawl being normally removable from the nut and including a stem having a head eccentrically mounted thereon and normally arranged to project within the bolt opening of the nut to engage the bolt, said head being adapted for interlocking engagement with the bolt and being movable into interlocking engagement with said shoulder when engaged by the bolt for maintaining the pawl in operative engagement with the nut.

3. A nut lock including a nut bored to receive a bolt and having a transversely extending recess formed in one face thereof, said recess communicating with the bolt opening of the nut, an overhanging shoulder formed on the nut and projecting into said recess, the bottom wall of said recess having a bore formed therein, a pawl carried by the nut, said pawl being normally removable from the nut and including a stem mounted in said bore, and a head eccentrically mounted upon the stem and provided with teeth, a spring carried by the head and embracing said stem, said spring being normally adapted to project the head of the pawl into the bolt opening formed in the nut, said head being adapted for interlocking engagement with the bolt and interlocking engagement with said shoulder when engaged by the bolt for maintaining the pawl in operative engagement with the nut, the teeth formed on said head being arranged to contact with the bolt.

4. A nut lock including a nut bored to receive a bolt and having a recess formed therein, a shoulder formed on the nut adjacent said recess, and an eccentrically mounted pawl including a substantially circular head arranged in said recess, said pawl being normally removable from the nut and having the head thereof arranged for interlocking engagement with the bolt and movable into interlocking engagement with said shoulder when engaged by the bolt for maintaining the pawl in operative engagement with the nut.

5. A nut lock including a nut bored to receive a bolt and having a shoulder formed thereon, a pawl detachably connected with the nut and arranged adjacent said shoulder and provided with an inclined face, said pawl being normally removable from the nut and being movable into interlocking engagement with the bolt with the inclined face thereof in interlocking engagement with said shoulder for maintaining the pawl in operative engagement with the nut.

6. A nut lock including a nut bored to receive a bolt, and a pawl detachably connected with the nut and normally removable therefrom, said pawl being arranged for interlocking engagement with the bolt and being movable to engage the nut, when engaged by the bolt, for maintaining the pawl in operative engagement with the nut.

In testimony whereof I affix my signature in presence of two witnesses.

ALONZO A. KING. [L. S.]

Witnesses:
F. E. LAMBERTSON,
A. R. CHAPMAN.

Copies of this patent may be obtained for five cents each, by addressing the "Commissioner of Patents, Washington, D. C."